Feb. 14, 1967     F. H. SCHROEDER     3,303,697
QUALITY CONTROL DEVICE FOR MEASURING CLING OF PLASTIC FILM
Filed July 8, 1964     3 Sheets-Sheet 1

INVENTOR.
FRANKLYN H. SCHROEDER
BY
ATTORNEYS

Feb. 14, 1967  F. H. SCHROEDER  3,303,697
QUALITY CONTROL DEVICE FOR MEASURING CLING OF PLASTIC FILM
Filed July 8, 1964  3 Sheets-Sheet 2

INVENTOR.
FRANKLYN H. SCHROEDER
BY
ATTORNEYS

Feb. 14, 1967 F. H. SCHROEDER 3,303,697
QUALITY CONTROL DEVICE FOR MEASURING CLING OF PLASTIC FILM
Filed July 8, 1964 3 Sheets-Sheet 3

INVENTOR.
FRANKLYN H. SCHROEDER
BY
ATTORNEYS

United States Patent Office 3,303,697
Patented Feb. 14, 1967

3,303,697
QUALITY CONTROL DEVICE FOR MEASURING CLING OF PLASTIC FILM
Franklyn H. Schroeder, Vincennes, Ind., assignor to The Dow Chemical Company, Midland, Mich., a corporation of Delaware
Filed July 8, 1964, Ser. No. 381,192
6 Claims. (Cl. 73—159)

This invention relates to apparatus for measuring the property of plastic film to cling to various types of surfaces. More specifically, it relates to a device for measuring the cling of various types of film to itself and to other surfaces to determine the suitability of such film for food wrapping and other purposes.

In addition to wax papers, various types of plastic film are now on the market for various wrapping purposes. These vary considerably according to the particular ploymer and modifier compositions. For example, polyethylene, polypropylene, polyvinylidene chloride film, etc. are available. These vary considerably in properties according to the composition and the particular uses for which they are designed. In order to serve the many purposes for which they are recommended, it is imperative that the cling properties of the film to itself and to other types of surfaces be within desired ranges to serve their ultimate purpose.

A certain amount of cling is desired for wrapping purposes so that the film will remain in position. However, it is desirable that there is not so much cling or adherence that would interfere with removal of the film.

Since the film is usually packaged in rolls, it is also desirable not to have too great an adherence of successive layers to each other. If the adherence is too great, the film will tear upon attempting to unroll it.

Consequently it is desirable to control this property of cling in plastic film according to its ultimate use. For that reason, it is desirable to have apparatus which can easily and qiuckly determine the cling property of plastic film both for development and production purposes. In development work it is important to test the cling property of plastic film as variations are being made in its composition or in modifying various other properties. For production purposes, it is desirable to have control testing conducted periodically to determine whether the film being produced for sale meets the specification for this particular property.

In accordance with this invention, it has now been found that the cling of plastic film to itself or to other types of surfaces can be easily determined by the apparatus described herein.

The apparatus of this invention is best described by reference to the accompanying drawings.

Figure 1:
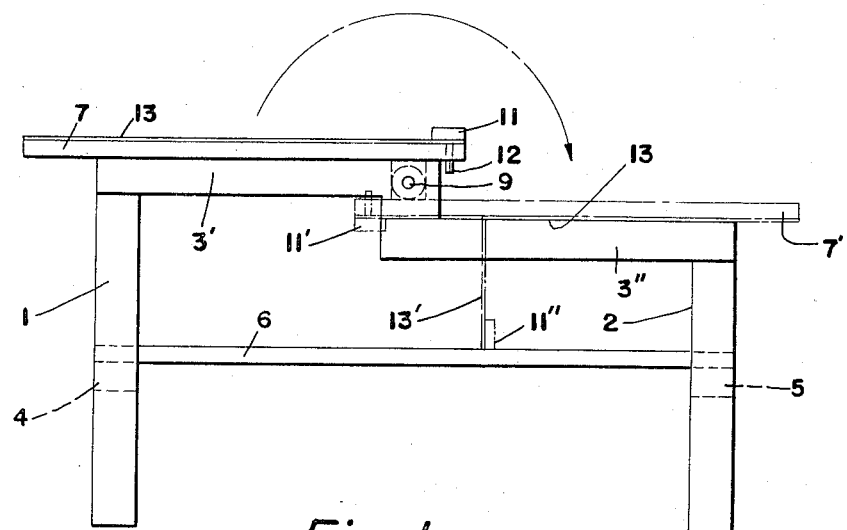
FIG. 1 is an elevational side view of the apparatus of this invention comprising a rotatable table top on which a sheet of the film is laid in a horizontial position with a weght attached at one end of the sheet with the table top being rotatable through 180°.
Figure 2:
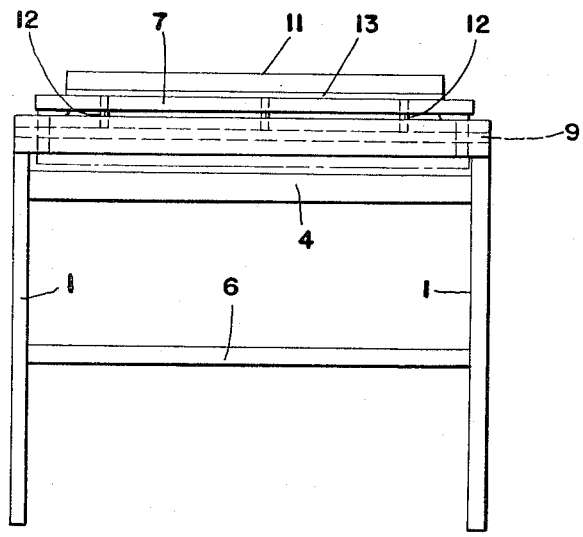
FIG. 2 is an elevational end view of the same apparatus on FIG. 1.
Figure 3:
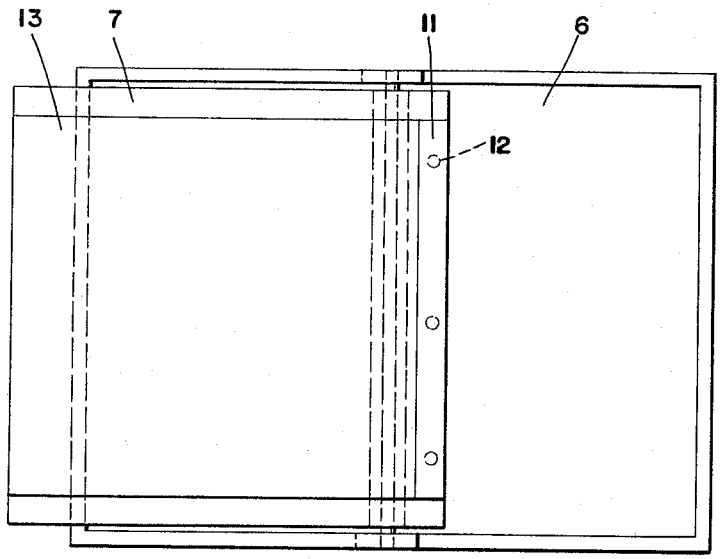
FIG. 3 is a top view of the apparatus of FIGS. 1 and 2.
Figure 4:
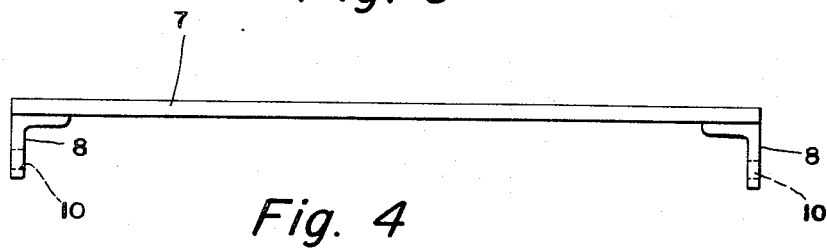
FIGS. 4 and 5 are an elevational end view and an elevational side view of the same table top by itself.
Figure 5:
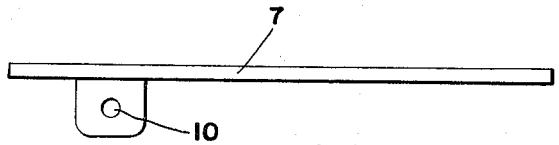
Figure 6:
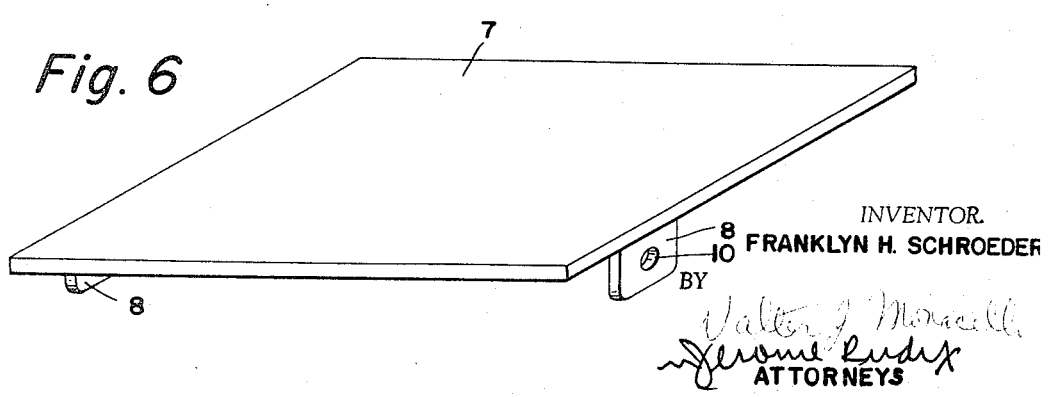
FIG. 6 is a perspective view of the same table top.

In the drawings, the supporting table comprises front legs 1, and rear legs 2, side support beam 3 having a raised portion 3' and a lower 3", front support beam 4, back supporting beam 5, a lower shelf 6 supported on the front and back beams 4 and 5. Table top 7 has side brackets 8, which are rotatable or pivotable on a pivot rod 9 inserted in openings 10 in brackets 8.

Block 11 is shown placed at one end of table top 7 with electromagnet 12 affixed to the table top on the opposite side and at a point opposite to that at which block 11 is located. Block 11 is comprised at least partially of a magnetizable material such as iron. The dotted section 7' indicates the position of table top 7 when it is pivoted from the horizontal position shown in FIG. 1 through 180° to the inverted horizontal position shown for 7. In this 180° rotation, block 11, which was originally resting on the top surface of table top 7 is represented as 11' and is supported only by the magnetic force exerted by electromagnetic 12. When the electromagnet is deactivated, the block 11 is no longer supported and the gravitational force on block 11 pulls down the film to which the block is attached, thereby separating the film clinging to the inverted table top 7' at a rate adversely according to the clinging property of film 13 until block 11 has reached the shelf 6 as shown in position 11", pulling down with it film 13 to the position shown as 13'.

Figure 7:
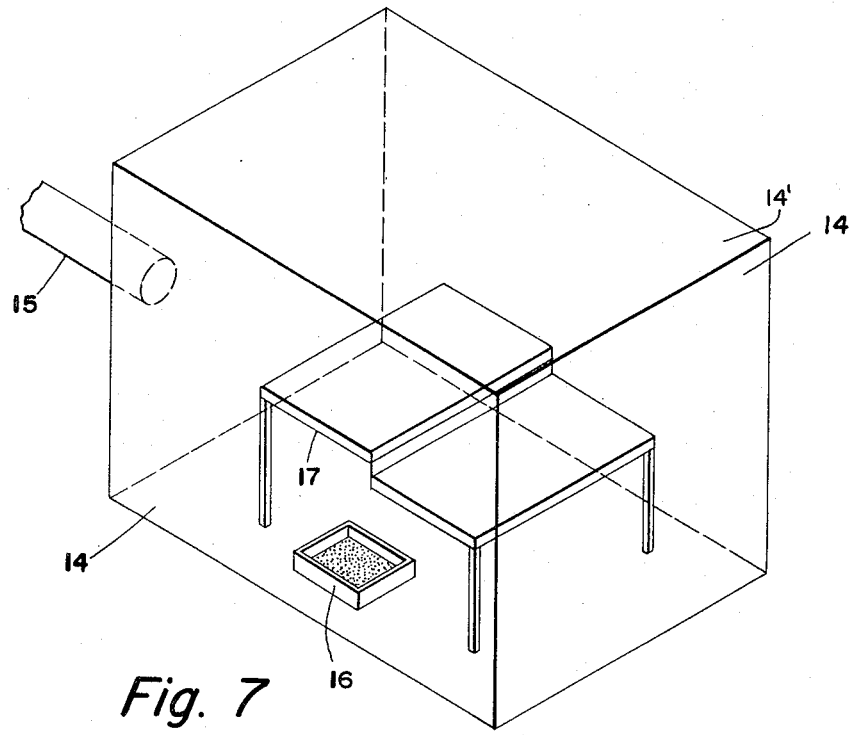
FIG. 7 is a perspective view of a chamber in which the apparatus of this invention is enclosed to provide controlled atmospheric conditions during the determination of the cling properties.

In FIG. 7, chamber walls 14 and ceiling 14' totally encase the cling measuring device of this invention. Outlet 15 is provided for the purpose of evacuating the atmosphere either to maintain a test under reduced pressure or to displace the atmosphere with a controlled atmosphere. Container 16 is provided for holding the desiccant or other material which will dehydrate or otherwise give the desired character to the atmosphere.

Although not shown, ceiling 14' can be opened so that the operator can apply for film and make various preparations prior to closing or sealing the chamber and effecting the desired atmospheric changes or controls. The table 17 is represented only in general outline, but the details of its construction are similar to those shown in FIG. 1. Also not shown are the various provisions by which the table top can be rotated 180° and also the controls by which electromagnet can be activated and deactivated from a position outside the chamber.

Figure 8:
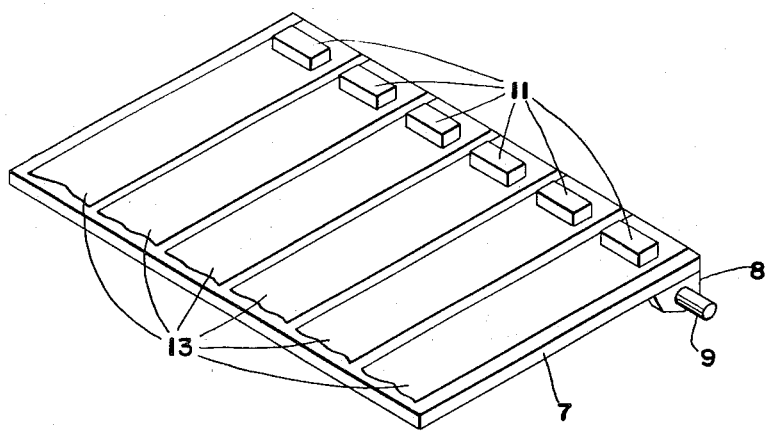
FIG. 8 shows a modification of the table top portion similar to that shown in FIG. 6, except that the modification of FIG. 8 is larger and provides a number of individual surfaces and individual weights for performing simultaneously a plurality of cling tests on the same table top.

In FIG. 8 a number of blocks 11 are shown in position to be affixed to the plurality of films 13 which are to be tested simultaneously by rotation of table top 7 on pivot rod 9 which is inserted in opening 10 of bracket 8.

In conducting a plurality of tests simultaneously as with the apparatus shown in FIG. 8, the various sheets of film having the weight attached at one end are placed in the respective positions on the table top and the various other steps performed as described above. The various electromagnets holding the respective weights in position are advantageously operated by a single switch so the weights are simultaneously released. Furthermore, the positions of the respective weights on the table top should be parallel with and equal distance from the edge of the table top so that when the test is initiated, the distance through which the weight will travel before it meets shelf 6 will be identical in each case.

Obviously the width of the sheet of film, or the width of the respective sheets of film in a plurality test is dependent on the dimensions of the table top. Therefore, the respective size of the equipment of the invention is determined in accordance with the width of sheets to be tested, as well as the number of sheets to be tested. The width of the table top should be in excess of the sum of the widths of the sheets being tested so that overlapping of edges is avoided. Generally, it is advantageous to have a size of equipment that will test the width of the sheet in which it is to be marketed. However, since the tests are comparative, it is generally only necessary that the sheets be of the same width for respective tests, regardless of the width in which the sheet is marketed.

In addition to the type of weight element shown in the drawings, various other types of weights can be used, such as a wire threaded through the film or a wire or other weight adhered to the film by means of adhesive tape, etc., making sure that the weight of the adhesive tape or other attaching means is uniform and included in the total weight.

In running the test for various types of film, it is desirable to run a number of tests, say 5–10 specimens of the same materials, and the results averaged. This is to avoid the possibility of a particular area of the film varying in cling property from the general value for the film. Variations can be caused by differences in smoothness of the film surface, foreign substances on the surface and also electrostatic charges on the surface. The size and weight of the weight element is selected appropriately, so that the time of the test is sufficient to allow accurate measurement. For example, the weight is such that the element will not fall immediately to the bench top and therefore make the time difficult to measure. To determine this, it is generally desirable to pick a very light weight and if the test takes too long, then the weight is increased. Here again, the weight bar can be selected in accordance with the range of cling properties being measured. For example, film having very high cling can be tested with heavier weights than those having very poor cling. However, for comparative purposes, the same weight should be applied to the respective sheets.

The relative size of the weight element represented in the drawing is actually out of proportion with regard to size of the table top. However, this is merely for illustrative purposes. The actual weight of the weight element is generally in the range of approximately 0.5–1 gm. per 12 inch width of film. With a weight element of 0.67 gms. and using a width of film of 11.6 inches, a test time of approximately 0.6–2 seconds or more is obtained, depending on the distance between the inverted surface of a table top and the shelf to which the weight must fall. Obviously, this time will vary according to the increased or decreased weight of the weight element, and also according to the respective cling values.

In conducting tests to determine the cling property of a plastic film, there are two types of tests generally performed, one where the cling is between two sheets of the same plastic film material, and the other is between the plastic film and a different surface. Unless the determination is for a very specific surface, it is generally sufficient to determine the cling property of the film to the table top of the apparatus. If the cling is to be measured to a surface other than the table top, such surface, such as glass, metal, etc. is laid flat on the table top and fastened by any convenient means so that it can be rotated with the table top.

In each case the surface to which the cling is measured is cleaned with solvent or other appropriate cleaning means to insure that the respective films have a uniformly clean surface to which to cling.

When the test is for the purpose of determining the cling property between two layers of the same film material, one sheet of film of larger dimensions is first laid smoothly on the table top and pressed gently against the table top surface with a roller. Then the edges of the film are adhered or attached to the table top surface by means of adhesive tape. It is generally advantageous to have this sheet of film extend over the edge of the table top at the end where the weight element is to be positioned. Then the adhesive will be applied at the edge of the table top to hold the film thereto.

Next the second sheet of film material of smaller length and width, is attached at one end to the weight element either by adhesive tape, pins, clamps, etc. Thereafter the second sheet of film is laid on the first sheet in an area not occupied by the adhesive tape holding the first sheet to the table top. The second sheet is laid with the weight element on the side thereof opposite from the first sheet. The second sheet is given a single pass with a roller using a gentle force to assure smooth and complete contact between the two sheets of film. In comparative tests similar roller force should be applied and, where more than one roller is used in different tests, the rollers should be of standardized weight, surface finish, and diameter so that comparative results may be obtained.

The electromagnets 12 are then activated so that the weight element 11 is held to the table top 7 with the two sheets of film material therein between. The table top 7 is pivoted about pivot rod 9 to the 180° position so that the weight element and the two sheets of film are on the underside of the table top as it is shown as 7' in its inverted position in FIG. 1. In this position the weight element 11' is held in position by the electromagnetic force. A timer is simultaneously activated with the deactivation of the electromagnet. This can be advantageously affected by having both operated by a single switch.

As the electromagnet is deactivated, the weight element 11' is no longer held in position and therefore the force of gravity pulls it away from the table top and with it the film to which it is attached. The rate at which the weight falls is in adverse proportion to the cling of the two films to each other. For standard determination, the test is run until the weight element touches shelf 6.

In cases where the cling is to be determined between the plastic film material and the table top itself or other surface attached thereto, the above described operation is performed without using the first sheet of film. In the latter case, the single sheet of film affixed to the weight element as described before, is placed in position on the table top and given a general pass with the roller to assure smooth and complete contact between the film and the table top, and the test is performed as described before.

Where the test is to be performed under controlled atmospheric conditions, such as in the chamber shown in FIG. 8, the preliminary preparation for the test is similar to that described above. Then the chamber is closed and the atmospheric conditions adjusted according to desired conditions. When the operator is satisfied that the atmospheric conditions have reached the desired state, the table top is inverted by a means activated outside the chamber. While different means may be used for this purpose, one convenient means is to have the pivot rod 9 affixed to the bracket 8 so that the table top will be pivoted when the pivot rod 9 is rotated on its own axis.

This can be effected by having the pivot rod 9 extend through to the exterior of the chamber and bent in the shape of a crank at its end so that when the crank is turned the pivot rod 9 turns on its axis and thereby effects the turning of the table top as desired. When atmospheric conditions in the chamber have reached the desired stage, the operator can deactivate the electromagnet to release the weight and thereby initiate the cling test. The electromagnet means of holding the weight in position is particularly advantageous in this case since it is much easier to maneuver from outside the chamber than would be other types of holding means.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A device for measuring the cling property of film, comprising the combination of a supporting table, a table top positioned on and supported by said supporting table and rotatable from a position substantially horizontal through 180° to a second substantially horizontal position in such a manner that the surface of said table top which, in its first position, is the upper surface of said table top, and is in its second position inverted to and becomes the lower surface of said table top, a weighted element adapted to be attached to one end of a sheet of plastic film placed on said table top in its initial position and free to fall away from said table top with said end of said sheet upon release after said table top has been inverted to its second position, a means adapted to hold said weight immobile during rotation of said table top and to release said weight after said rotation.

2. The apparatus of claim 1 in which said apparatus is enclosed in a sealable chamber adapted for controlling the nature of the atmosphere contained in said chamber.

3. The apparatus of claim 1 in which said table top is adapted to receive a number of sheets of plastic film and having in combination with said table top a number of said weighted elements corresponding to the number of said sheet positioned thereon.

4. A device for measuring the cling property of film, comprising the combination of a supporting table, a table top positioned on and supported by said supporting table and rotatable from a position substantially horizontal through 180° to a second substantially horizontal position in such a manner that the surface of said table top which, in its first position, is the upper surface of said table top, is in its second position inverted to and becomes the lower surface of said table top, a weighted element adapted to be attached to a sheet of plastic film placed on said table top in its initial position and free to fall away from said table top upon release after said table top has been inverted to its second position, said table top having affixed thereto an electromagnet adapted by magnetic force to hold said weighted element in position against said table top with said film positioned therein between until said electromagnet is deactivated.

5. The apparatus of claim 4 in which said apparatus is enclosed in a sealable chamber adapted for controlling the nature of the atmosphere contained in said chamber.

6. The apparatus of claim 4 in which said table top is adapted to receive a number of sheets of plastic film and has in combination with said table top a number of said weighted elements corresponding to the number of said sheets positioned thereon.

References Cited by the Examiner
UNITED STATES PATENTS

| | | | |
|---|---|---|---|
| 1,885,209 | 11/1932 | Koester | 73—159 |
| 3,098,377 | 7/1963 | Beauchamp | 73—9 |

DAVID SCHONBERG, *Primary Examiner.*